Jan. 9, 1923.
M. McCRIGHT.
LOW VOLTAGE ATTACHMENT.
FILED OCT. 30, 1919.
1,441,233
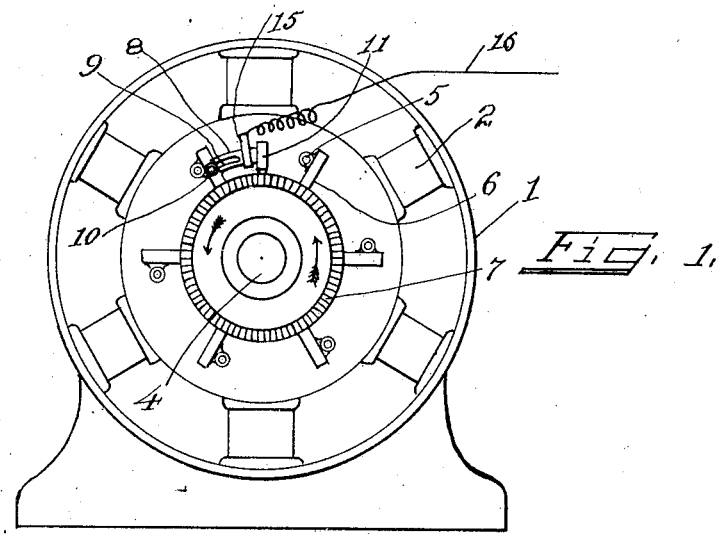
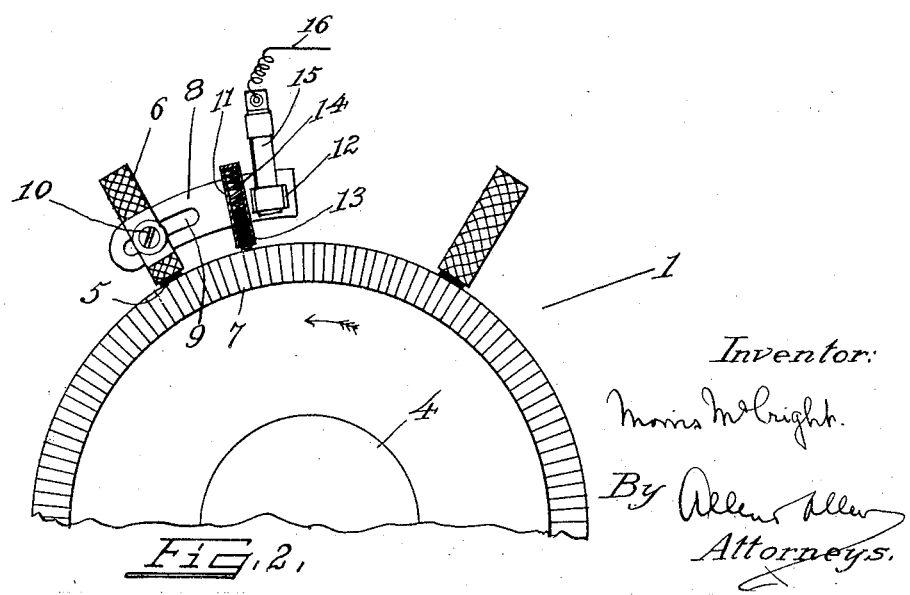
Inventor:
Morris McCright.
By Allen & Allen
Attorneys.

Patented Jan. 9, 1923.

1,441,233

UNITED STATES PATENT OFFICE.

MORRIS McCRIGHT, OF CINCINNATI, OHIO.

LOW-VOLTAGE ATTACHMENT.

Application filed October 30, 1919. Serial No. 334,406.

*To all whom it may concern:*

Be it known that I, MORRIS McCRIGHT, a citizen of the United States, and a resident of the city of Cincinnati, in the county of Hamilton and State of Ohio, have invented certain new and useful Improvements in Low-Voltage Attachments, of which the following is a full, clear, and exact description, reference being had to the accompanying drawings, forming a part of this specification.

My invention relates to attachments for dynamo electric machines and motors, generating or using direct current, which will take off of the said machines a current of low voltage capable of being employed in the place of dry cells, wet batteries, or other accepted source of low voltage current.

It has, as its object, the provision of an attachment to be mounted on the brush holders to be found in all types of motors, which attachment carries with it a brush holder and brush which takes off current of the same polarity as that of the brush and holder to which it is attached. It is my further object to make the attachment adjustable so that the desired number of commutator bars may be spanned by the auxiliary or low voltage brush.

These objects and other advantages to be noted I accomplish by that certain construction and arrangement of parts to be hereinafter more specifically pointed out and claimed.

In the drawings,

Figure 1 is an elevation somewhat diagrammatic of a direct current dynamo illustrating one of my new attachments in place.

Figure 2 is a detail view of a portion of the same parts on a larger scale.

The current from the commutator bars of a generator or motor is taken off or applied as the case may be, by means of brushes which are held in brush holders, so as to be adjustable for position in bridging said bars at the neutral point.

As shown in Figures 1 and 2, the dynamo 1 may have as many field coils 2, as desired, and the dynamo will have the same number of brush holders 5 carrying brushes 6. The brushes are set over the commutator bars 7 of the rotor or armature 4, so that they take off the current generated in the coils, at the neutral point between change of lines of force between one field magnet and the next.

I have illustrated but one attachment as applied to the generator 1, although it will be understood that within limits that will readily make themselves evident, I may apply more than one attachment, up to the number desired. Subject to obvious modifications due to the nature of the brush holder of the machine to be fitted up, I provide a sector plate 8, having a slot 9 therein for adjustment purposes, and attach the segment to the desired brush holder 5 by means such as a screw 10, passing through the slot.

The sector carries at its outer end a small fitting which comprises a brush holder 11, and a fuse clip 12. Within the holder is placed a brush 13, controlled by a brush spring 14, as in ordinary practise, and the fuse clip retains a fuse 15, which takes the current from the brush and transmits it, as for example through the connection 16.

The sector is made of insulating material, and its size and range of adjustment may be made as required. Once the attachment is set, the additional or low voltage brush 13 will take current off of the commutator bar to which it is set, which said current will not differ greatly in voltage from the current of the main brush itself. There will be a proportionally small difference of potential, however, such that the closing of a circuit connection between the brush to which the device is attached and the low voltage brush, will cause a current to flow, which has an amperage dependent upon factors of construction of the dynamo and labor or duties to perform, and a voltage determined by the distance of the small brush away from the main brush of the selected polarity.

The establishing of this low potential current through a circuit tapped off of the line running from the selected main brush will not interfere with the operation of the dynamo as a normal dynamo, at full voltage, subject to the obvious limitations in load to be met by the total of all current taken off the machine.

Thus by my invention I use up some of the available amperage of the machine, in an additional low voltage circuit, and I can establish off of the desired number of brushes, the desired number of low voltage circuits, or parallel up several such circuits around a single rotor or armature, as desired, dependent upon the amount of work which the generator as a whole is called upon to do.

I can thus, from a single dynamo, running and doing its regular work, operate a bell system, and charge storage batteries or do other work requiring low voltage and non-fluctuating current that is usually done by chemical action.

Not only this, but due to the fact that my additional or low voltage brushes are attached to the main brushes, I am enabled to move them for adjustment to the load, along with the main brushes, and once set to span the desired number of bars. The attachment thus needs no attention separate and apart from the main brushes.

In connection with my described device for securing the low voltage brush in place it will be understood that the attachment to the brush holder proper of a regular brush is not the only way in which the attachment could be made to move as a unit with the brush to which its circuit connection is to be made. Thus an adjustable mounting on the device that mounts and shifts all the regular brush holders in a dynamo, sometimes called the "quadrant" would serve my purpose as well as the mounting described. In calling for a brush in the claim that follows I mean to include such mechanism as moves as a unit with such holder.

Having thus described my invention, what I claim as new and desire to secure by Letters Patent is:—

An attachment for direct current electric machines comprising a sector plate, means on the plate for carrying a brush, and a fuse mounted on the sector plate, electric connections running from said fuse, a slot in the plate, and a screw to secure said plate adjustably on the desired brush holder of said machine.

MORRIS McCRIGHT.